United States Patent
Dazai et al.

(10) Patent No.: US 10,995,234 B2
(45) Date of Patent: May 4, 2021

(54) METHOD OF PRODUCING STRUCTURE CONTAINING PHASE-SEPARATED STRUCTURE

(71) Applicant: TOKYO OHKA KOGYO CO., LTD., Kawasaki (JP)

(72) Inventors: Takahiro Dazai, Kawasaki (JP); Hitoshi Yamano, Kawasaki (JP); Akiya Kawaue, Kawasaki (JP); Ken Miyagi, Kawasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 83 days.

(21) Appl. No.: 16/335,129

(22) PCT Filed: Sep. 26, 2017

(86) PCT No.: PCT/JP2017/034702
§ 371 (c)(1),
(2) Date: Mar. 20, 2019

(87) PCT Pub. No.: WO2018/062157
PCT Pub. Date: Apr. 5, 2018

(65) Prior Publication Data
US 2019/0276698 A1    Sep. 12, 2019

(30) Foreign Application Priority Data

Sep. 28, 2016 (JP) .............................. JP2016-189521

(51) Int. Cl.
| | |
|---|---|
| C09D 135/00 | (2006.01) |
| C09D 153/00 | (2006.01) |
| C08J 7/00 | (2006.01) |
| B05D 3/00 | (2006.01) |
| B82Y 40/00 | (2011.01) |
| B05D 5/00 | (2006.01) |

(52) U.S. Cl.
CPC ............. *C09D 153/00* (2013.01); *B05D 3/00* (2013.01); *B05D 5/00* (2013.01); *B82Y 40/00* (2013.01); *C08J 7/00* (2013.01)

(58) Field of Classification Search
CPC ...... B32B 27/00; B32B 27/302; B32B 27/308
See application file for complete search history.

(56) References Cited

U.S. PATENT DOCUMENTS

| | | |
|---|---|---|
| 2009/0240001 A1 | 9/2009 | Regner |
| 2010/0035158 A1 | 2/2010 | Kato et al. |
| 2017/0240766 A1 | 8/2017 | Kawaue et al. |
| 2017/0240767 A1 | 8/2017 | Kawaue et al. |
| 2018/0362692 A1 | 12/2018 | Morita |

FOREIGN PATENT DOCUMENTS

| | | |
|---|---|---|
| JP | 2008-036491 A | 2/2008 |
| JP | 2011-518652 A | 6/2011 |
| JP | 2013-212489 A | 10/2013 |
| WO | WO 2008/044546 A1 | 4/2008 |
| WO | WO 2017/110190 A1 | 6/2017 |

OTHER PUBLICATIONS

Chen et al (Ionic liquids as additives to polystyrene-block-poly(methyl methacrylate) enabling directed self-assembly of patterns with sub 10 nm features, ACS Applied Materials & Interfaces 2018, 10, 16747-16759) (Year: 2018).*
Hinsberg et al., "Self-Assembling Materials for Lithographic Patterning: Overview, Status and Moving Forward", Proc. of SPIE, vol. 7637, 76370G-1-76370G-11, 2010.
International Search Report issued in International Application No. PCT/JP2017/034702, dated Dec. 19, 2017.
Office Action in U.S. Appl. No. 16/299,621 dated Jun. 29, 2020.

* cited by examiner

*Primary Examiner* — Wenwen Cai
(74) *Attorney, Agent, or Firm* — Knobbe Martens Olson & Bear LLP

(57) ABSTRACT

A method of producing a structure containing a phase-separated structure, including: a step of using a resin composition for forming a phase-separated structure including a block copolymer and an ion liquid containing a compound (IL) having a cation moiety and an anion moiety to form a BCP layer (3) containing a block copolymer on a substrate (1); and a step of vaporizing at least a part of the compound (IL), and phase-separating the BCP layer (3) to obtain a structure (3') containing a phase-separated structure.

3 Claims, 2 Drawing Sheets

METHOD OF PRODUCING STRUCTURE CONTAINING PHASE-SEPARATED STRUCTURE

TECHNICAL FIELD

The present invention relates to a method of producing a structure containing a phase-separated structure.

Priority is claimed on Japanese Patent Application No. 2016-189521, filed Sep. 28, 2016, the content of which is incorporated herein by reference.

DESCRIPTION OF RELATED ART

Recently, as further miniaturization of large scale integrated circuits (LSI) proceeds, a technology for processing a more delicate structure is demanded.

In response to such demand, development has been conducted on a technology in which a fine pattern is formed using a phase-separated structure formed by self-assembly of a block copolymer having mutually incompatible blocks bonded together (see, for example, Patent Document 1).

For using a phase-separation structure of a block copolymer, it is necessary to form a self-organized nano structure by a microphase separation only in specific regions, and arrange the nano structure in a desired direction. For realizing position control and orientational control, processes such as graphoepitaxy to control phase-separated pattern by a guide pattern and chemical epitaxy to control phase-separated pattern by difference in the chemical state of the substrate are proposed (see, for example, Non-Patent Document 1).

A block copolymer forms a regular periodic structure by phase separation.

A "period of a structure" refers to a period of a phase structure observed when a phase-separated structure is formed, and is a sum of the lengths of the phases which are mutually incompatible. In the case of forming a cylinder structure which has a phase-separated structure perpendicular to a surface of a substrate, the period (L0) of the structure is the center distance (pitch) of two mutually adjacent cylinder structures.

It is known that the period (L0) of a block polymer is determined by intrinsic polymerization properties such as the polymerization degree N and the Flory-Huggins interaction parameter $\chi$. Specifically, the repulsive interaction between different block components of the block copolymer becomes larger as the product of $\chi$ and N, "$\chi \cdot N$" becomes larger. Therefore, when $\chi \cdot N > 10$ (hereafter, referred to as "strong segregation limit"), there is a strong tendency for the phase separation to occur between different blocks in the block copolymer. At the strong segregation limit, the period of the block copolymer is approximately $N^{2/3} \cdot \chi^{1/6}$, and a relationship represented by following formula (1) is satisfied. That is, the period of the structure is in proportion to the polymerization degree N which correlates with the molecular weight and molecular weight ratio between different blocks.

$$L0 \propto a \cdot N^{2/3} \cdot \chi^{1/6} \tag{1}$$

In the formula, L0 represents the period of the structure; a represents a parameter indicating the size of the monomer; N represents the polymerization degree; and x indicates an interaction parameter. The larger the value of the interaction parameter, the higher the phase-separation performance Therefore, by adjusting the composition and the total molecular weight of the block copolymer, the period (L0) of the structure can be adjusted.

It is known that the periodic structure formed by a block copolymer changes to a cylinder, a lamellar or a sphere, depending on the volume ratio or the like of the polymer components. Further, it is known that the period depends on the molecular weight.

Therefore, in order to form a structure having a relatively large period (L0) using a phase-separated structure formed by self-assembly of a block copolymer, it is considered that such structure may be formed by increasing the molecular weight of the block copolymer.

DOCUMENTS OF RELATED ART

Patent Literature

[Patent Document 1] Japanese Unexamined Patent Application, First Publication No. 2008-36491

Non-Patent Documents

[Non-Patent Document 1] Proceedings of SPIE (U.S.), vol. 7637, pp. 76370G-1 (2010)

SUMMARY OF THE INVENTION

However, currently, in the case of forming a structure using a phase-separated structure formed by directed self-assembly of a widely used block copolymer (e.g., a block copolymer having a styrene block and a methyl methacrylate block), is was difficult to further improve the phase-separation performance. In addition, a technique for forming a phase-separated structure having a good shape and reduced roughness on the surface of the structure has been demanded.

The present invention takes the above circumstances into consideration, with an object of providing a method of producing a structure containing a phase-separated structure which enables formation of a phase-separated structure with good phase-separation performance and reduced roughness.

For solving the above-mentioned problems, the present invention employs the following aspects.

Specifically, a first aspect of the present invention is a method of producing a structure containing a phase-separated structure, including: a step of using a resin composition for forming a phase-separated structure including a block copolymer and an ion liquid containing a compound (IL) having a cation moiety and an anion moiety to form a BCP layer containing a block copolymer on a substrate; and a step of vaporizing at least a part of the compound (IL), and phase-separating the BCP layer to obtain a structure containing a phase-separated structure.

According to the present invention, there is provided a method of producing a structure containing a phase-separated structure which enables formation of a phase-separated structure with good phase-separation performance and reduced roughness.

DETAILED DESCRIPTION OF THE INVENTION

Figure 1:
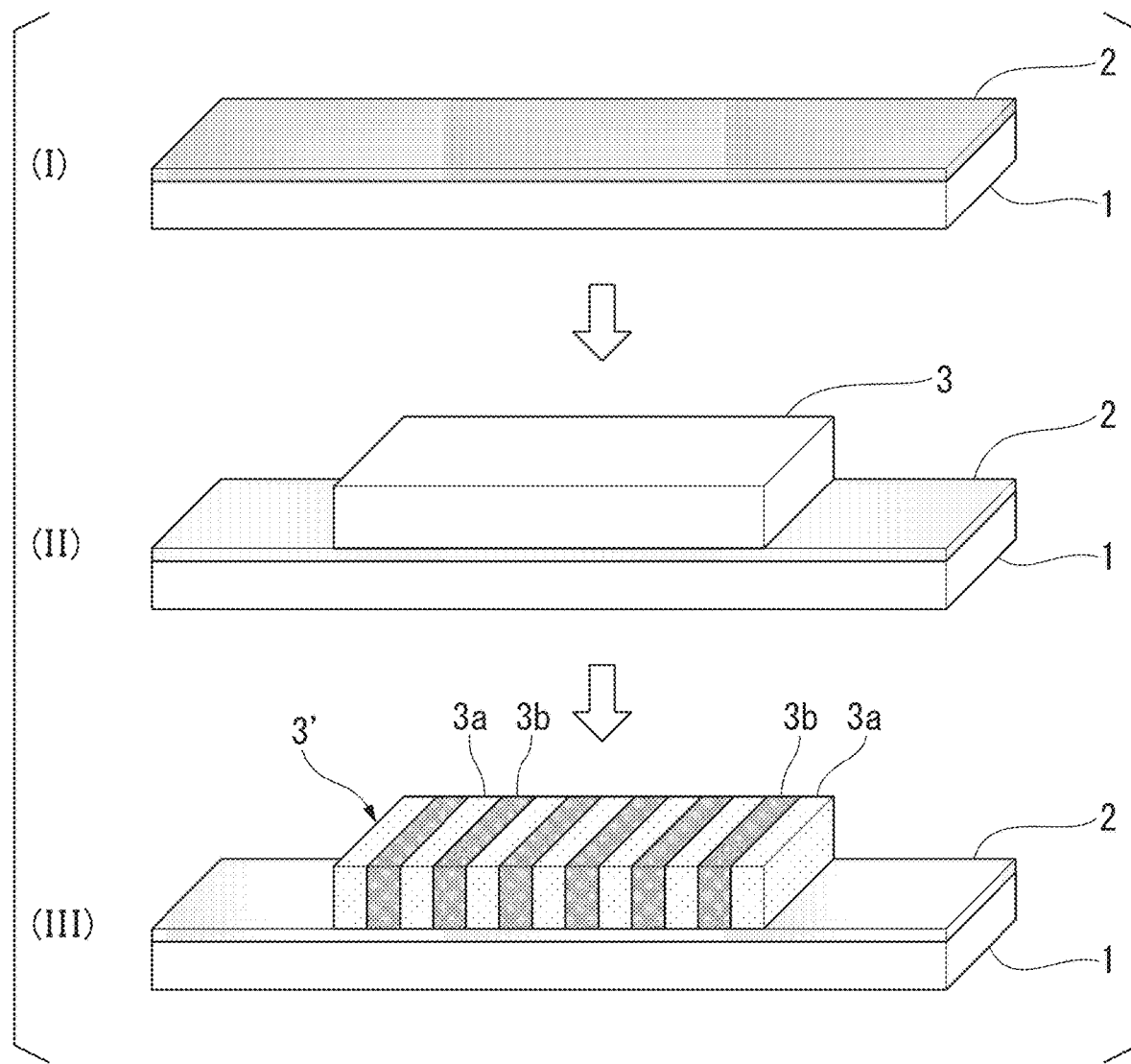
FIG. 1 is a schematic diagram showing an example of one embodiment of the method of forming a structure containing a phase-separated structure according to the present invention.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified. The same applies for the alkyl group within an alkoxy group.

The term "alkylene group" includes linear, branched or cyclic, divalent saturated hydrocarbon, unless otherwise specified.

A "halogenated alkyl group" is a group in which part or all of the hydrogen atoms of an alkyl group is substituted with a halogen atom. Examples of the halogen atom include a fluorine atom, a chlorine atom, a bromine atom and an iodine atom.

A "fluorinated alkyl group" or a "fluorinated alkylene group" is a group in which part or all of the hydrogen atoms of an alkyl group or an alkylene group have been substituted with a fluorine atom.

The term "structural unit" refers to a monomer unit that contributes to the formation of a polymeric compound (resin, polymer, copolymer).

The expression "may have a substituent" means that a case where a hydrogen atom (—H) is substituted with a monovalent group, or a case where a methylene (—CH$_2$—) group is substituted with a divalent group.

The term "exposure" is used as a general concept that includes irradiation with any form of radiation.

A "structural unit derived from an acrylate ester" refers to a structural unit that is formed by the cleavage of the ethylenic double bond of an acrylate ester.

An "acrylate ester" refers to a compound in which the terminal hydrogen atom of the carboxy group of acrylic acid (CH$_2$=CH—COOH) has been substituted with an organic group.

The acrylate ester may have the hydrogen atom bonded to the carbon atom on the α-position substituted with a substituent. The substituent)(R$^{α0}$) that substitutes the hydrogen atom bonded to the carbon atom on the α-position is an atom other than hydrogen or a group, and examples thereof include an alkyl group of 1 to 5 carbon atoms and a halogenated alkyl group of 1 to 5 carbon atoms. Further, an acrylate ester having the hydrogen atom bonded to the carbon atom on the α-position substituted with a substituent) (R$^{α0}$) in which the substituent has been substituted with a substituent containing an ester bond (e.g., an itaconic acid diester), or an acrylic acid having the hydrogen atom bonded to the carbon atom on the α-position substituted with a substituent) (R$^{α0}$) in which the substituent has been substituted with a hydroxyalkyl group or a group in which the hydroxy group within a hydroxyalkyl group has been modified (e.g., α-hydroxyalkyl acrylate ester) can be mentioned as an acrylate ester having the hydrogen atom bonded to the carbon atom on the α-position substituted with a substituent.

A carbon atom on the α-position of an acrylate ester refers to the carbon atom bonded to the carbonyl group, unless specified otherwise.

Hereafter, an acrylate ester having the hydrogen atom bonded to the carbon atom on the α-position substituted with a substituent is sometimes referred to as "α-substituted acrylate ester". Further, acrylate esters and α-substituted acrylate esters are collectively referred to as "(α-substituted) acrylate ester".

A "structural unit derived from hydroxystyrene" refers to a structural unit that is formed by the cleavage of the ethylenic double bond of hydroxystyrene. A "structural unit derived from a hydroxystyrene derivative" refers to a structural unit that is formed by the cleavage of the ethylenic double bond of a hydroxystyrene derivative.

The term "hydroxystyrene derivative" includes compounds in which the hydrogen atom at the α-position of hydroxystyrene has been substituted with another substituent such as an alkyl group or a halogenated alkyl group; and derivatives thereof. Examples of the derivatives thereof include hydroxystyrene in which the hydrogen atom of the hydroxy group has been substituted with an organic group and may have the hydrogen atom on the α-position substituted with a substituent; and hydroxystyrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

As the substituent which substitutes the hydrogen atom on the α-position of hydroxystyrene, the same substituents as those described above for the substituent on the α-position of the aforementioned α-substituted acrylate ester can be mentioned.

The term "styrene" is a concept including styrene and compounds in which the hydrogen atom at the α-position of styrene is substituted with other substituent such as an alkyl group and a halogenated alkyl group.

The term "styrene derivative" includes compounds in which the hydrogen atom at the α-position of styrene has been substituted with another substituent such as an alkyl group or a halogenated alkyl group; and derivatives thereof. Examples of the derivatives thereof include hydroxystyrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

A "structural unit derived from styrene" or "structural unit derived from a styrene derivative" refers to a structural unit that is formed by the cleavage of the ethylenic double bond of styrene or a styrene derivative.

As the alkyl group as a substituent on the α-position, a linear or branched alkyl group is preferable, and specific examples include alkyl groups of 1 to 5 carbon atoms, such as a methyl group, an ethyl group, a propyl group, an isopropyl group, an n-butyl group, an isobutyl group, a tert-butyl group, a pentyl group, an isopentyl group and a neopentyl group.

Specific examples of the halogenated alkyl group as the substituent on the α-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Specific examples of the hydroxyalkyl group as the substituent on the α-position include groups in which part or all of the hydrogen atoms of the aforementioned "alkyl group as the substituent on the α-position" are substituted with a hydroxy group. The number of hydroxy groups within the hydroxyalkyl group is preferably 1 to 5, and most preferably 1.

(Method of Producing Structure Containing Phase-Separated Structure)

The method of producing a structure containing a phase-separated structure according to the present embodiment includes: a step of using a resin composition for forming a phase-separated structure including a block copolymer and an ion liquid containing a compound (IL) having a cation moiety and an anion moiety (hereafter, referred to as "resin composition for forming a phase-separated structure") to form a BCP layer containing a block copolymer (hereafter, referred to as "step (i)") on a substrate; and a step of vaporizing at least a part of the compound (IL), and phase-separating the BCP layer to obtain a structure containing a phase-separated structure (hereafter, referred to as "step (ii)").

Hereinafter, the method of producing a structure containing a phase-separated structure will be specifically described with reference to FIG. 1. However, the present invention is not limited to these embodiments.

FIG. 1 shows an example of one embodiment of the method of forming a structure containing a phase-separated structure.

Firstly, a brush composition is applied to a substrate 1, so as to form a brush layer 2 (FIG. 1 (I)).

Then, to the brush layer 2, a resin composition for forming a phase-separated structure is applied, so as to form a BCP layer 3 (FIG. 1(II); step (i)).

Next, heating is conducted to perform an annealing treatment, so as to phase-separate the BCP layer 3 into a phase 3a and a phase 3b (FIG. 1 (III); step (ii)).

According to the production method of the present embodiment, that is, the production method including the steps (i) and (ii), a structure 3' containing a phase-separated structure is formed on the substrate 1 having the brush layer 2 formed thereon.

[Step (i)]

In step (i), the resin composition for forming a phase-separated structure is applied to the substrate 1, so as to form a BCP layer 3.

There are no particular limitations on the type of a substrate, provided that the resin composition for forming a phase-separated structure can be coated on the surface of the substrate.

Examples of the substrate include a substrate constituted of an inorganic substance such as a metal (e.g., silicon, copper, chromium, iron or aluminum), glass, titanium oxide, silica or mica; and a substrate constituted of an organic substance such as an acrylic plate, polystyrene, cellulose, cellulose acetate or phenol resin.

The size and the shape of the substrate is not particularly limited. The substrate does not necessarily need to have a smooth surface, and a substrate made of various materials and having various shapes can be appropriately selected for use. For example, a multitude of shapes can be used, such as a substrate having a curved surface, a plate having an uneven surface, and a thin sheet.

On the surface of the substrate, an inorganic and/or organic film may be provided. As the inorganic film, an inorganic antireflection film (inorganic BARC) can be used. As the organic film, an organic antireflection film (organic BARC) can be used.

Before forming a BCP layer 3 on the substrate 1, the surface of the substrate 1 may be cleaned. By cleaning the surface of the substrate, application of the resin composition for forming a phase-separated structure or the brush composition to the substrate 1 may be satisfactorily performed.

As the cleaning treatment, a conventional method may be used, and examples thereof include an oxygen plasma treatment, a hydrogen plasma treatment, an ozone oxidation treatment, an acid alkali treatment, and a chemical modification treatment. For example, the substrate is immersed in an acidic solution such as a sulfuric acid/hydrogen peroxide aqueous solution, followed by washing with water and drying. Thereafter, a BCP layer 3 or a brush layer 2 is formed on the surface of the substrate.

Before forming a BCP layer 3 on the substrate 1, the surface of the substrate 1 may be subjected to a neutralization treatment.

A neutralization treatment is a treatment in which the surface of the substrate is modified so as to have affinity for all polymers constituting the block copolymer. By the neutralization treatment, it becomes possible to prevent only phases of specific polymers to come into contact with the surface of the substrate by phase separation. For example, prior to forming a BCP layer 3, on the surface of the substrate 1, it is preferable to form a brush layer 2 depending on the kind of block copolymer to be used. As a result, by phase-separation of the BCP layer 3, a cylinder structure or lamellar structure oriented in a direction perpendicular to the surface of the substrate 1 can be reliably formed.

Specifically, on the surface of the substrate 1, a brush layer 2 is formed using a brush composition having affinity for all polymers constituting the block copolymer.

The brush composition can be appropriately selected from conventional resin compositions used for forming a thin film, depending on the kind of polymers constituting the block copolymer.

Examples of the brush composition include a composition containing a resin which has all structural units of the polymers constituting the block copolymer, and a composition containing a resin which has all structural units having high affinity for the polymers constituting the block copolymer.

For example, when a block copolymer having a block of a structural unit derived from styrene (PS) and a block of a structural unit derived from methyl methacrylate (PMMA) (PS-PMMA block copolymer) is used, as the brush composition, it is preferable to use a resin composition containing both PS and PMMA as blocks, or a compound or a composition containing both a portion having a high affinity for an aromatic ring and a portion having a high affinity for a functional group with high polarity.

Examples of the resin composition containing both PS and PMMA as blocks include a random copolymer of PS and PMMA, and an alternating polymer of PS and PMMA (a copolymer in which the respective monomers are alternately copolymerized).

Examples of the composition containing both a portion having a high affinity for PS and a portion having a high affinity for PMMA include a resin composition obtained by polymerizing at least a monomer having an aromatic ring and a monomer having a substituent with high polarity. Examples of the monomer having an aromatic ring include a monomer having a group in which one hydrogen atom has been removed from the ring of an aromatic hydrocarbon, such as a phenyl group, a biphenyl group, a fluorenyl group, a naphthyl group, an anthryl group or a phenanthryl group, or a monomer having a hetero aryl group such as the aforementioned group in which part of the carbon atoms constituting the ring of the group has been substituted with a hetero atom such as an oxygen atom, a sulfur atom or a nitrogen atom. Examples of the monomer having a substituent with high polarity include a monomer having a trimethoxysilyl group, a trichlorosilyl group, a carboxy group, a hydroxy group, a cyano group or a hydroxyalkyl group in which part of the hydrogen atoms of the alkyl group has been substituted with fluorine atoms.

Examples of the compound containing both a portion having a high affinity for PS and a portion having a high affinity for PMMA include a compound having both an aryl group such as a phenethyltrichlorosilane and a substituent with high polarity, and a compound having both an alkyl group and a substituent with high polarity, such as an alkylsilane compound.

Further, as the brush composition, for example, a heat-polymerizable resin composition, or a photosensitive resin composition such as a positive resist composition or a negative resist composition can also be mentioned.

The brush layer may be formed by a conventional method. The method of applying the brush composition to the substrate 1 to form a brush layer 2 is not particularly limited, and the brush layer 2 can be formed by a conventional method.

For example, the brush composition can be applied to the substrate 1 by a conventional method using a spinner or the like to form a coating film on the substrate 1, followed by drying, thereby forming a brush layer 2.

The drying method of the coating film is not particularly limited, provided it can volatilize the solvent contained in the brush composition, and a baking method and the like are exemplified. The baking temperature is preferably 80° C. to 300° C., more preferably 180° C. to 270° C., and still more preferably 220° C. to 250° C. The baking time is preferably 30 seconds to 500 seconds, and more preferably 60 seconds to 400 seconds.

The thickness of the brush layer 2 after drying of the coating film is preferably about 10 to 100 nm, and more preferably about 40 to 90 nm.

Subsequently, on the brush layer 2, a BCP layer 3 is formed using a resin composition for forming a phase-separated structure.

The method of forming the BCP layer 3 on the brush layer 2 is not particularly limited, and examples thereof include a method in which the resin composition for forming a phase-separated structure is applied to the brush layer 2 by a conventional method using spincoating or a spinner, followed by drying.

The drying method of the coating film of the resin composition for forming a phase-separated structure is not particularly limited, provided it can volatilize the organic solvent component included in the resin composition for forming a phase-separated structure. Examples of the drying method include a shaking method and a baking method.

The BCP layer 3 may have a thickness satisfactory for phase-separation to occur. In consideration of the kind of the substrate 1, the structure period size of the phase-separated structure to be formed, and the uniformity of the nanostructure, the thickness is preferably 10 to 100 nm, and more preferably 30 to 80 nm.

For example, in the case where the substrate 1 is an Si substrate or an $SiO_2$, the thickness of the BCP layer 3 is preferably 20 to 100 nm, and more preferably 30 to 80 nm.

In the case where the substrate 1 is a Cu substrate, the thickness of the BCP layer 3 is preferably 10 to 100 nm, and more preferably 30 to 80 nm.

[Step (ii)]

In step (ii), at least a part of the compound (IL) is volatilized, and the BCP layer 3 formed on the substrate 1 is phase-separated.

For example, by heating the substrate 1 after step (i) to conduct the anneal treatment, the block copolymer may be selectively removed, such that a phase-separated structure in which at least part of the surface of the substrate 1 is exposed may formed. That is, on the substrate 1, a structure 3' containing a phase-separated structure in which phase 3a and phase 3b are phase separated is produced.

The anneal treatment is preferably conducted under temperature condition where at least a part of the compound (IL) may be volatilized, so as to remove the compound (IL) from the BCP layer. As an example of such temperature condition, the anneal treatment may be conducted at a temperature of 210° C. or higher. That is, in step (ii), an anneal treatment is preferably conducted at a temperature of 210° C. or higher, so as to volatilize at least a part of the compound (IL), and remove the compound (IL) from the BCP layer. In the above operation, the amount of the compound (IL) removed from the BCP layer may be all of the compound (IL) contained in the BCP layer, or a part of the compound (IL) contained in the BCP layer.

The temperature condition in the anneal treatment is preferably 210° C. or higher, more preferably 220° C. or higher, still more preferably 230° C. or higher, and most preferably 240° C. or higher. The upper limit of the temperature condition in the anneal treatment is not particularly limited, but is preferably lower than the heat decomposition temperature of the block copolymer. For example, the temperature condition of the anneal treatment is preferably 400° C. or lower, more preferably 350° C. or lower, and still more preferably 300° C. or lower. The range of the temperature conditions in the anneal treatment may be, for example, 210 to 400° C., 220 to 350° C., 230 to 300° C., or 240 to 300° C.

In the anneal treatment, the heating time is preferably 1 minute or more, more preferably 5 minutes or more, still more preferably 10 minutes or more, and most preferably 15 minutes or more. By extending the heating time, the amount of the compound (IL) remaining in the BCP layer may be reduced. The upper limit of the heating time is not particularly limited. In view of controlling the process time, the heating time is preferably 240 minutes or less, and more preferably 180 minutes or less. The range of the heating time in the anneal treatment may be, for example, 1 to 240 minutes, 5 to 240 minutes, 10 to 240 minutes, 15 to 240 minutes, or 15 to 180 minutes.

Further, the anneal treatment is preferably conducted in a low reactive gas such as nitrogen.

By conducting an anneal treatment, the compound (IL) is volatilized and removed from the BCP layer. As a result, in the BCP layer after the anneal treatment (i.e., structure 3' in FIG. 1 (III)), the film thickness is reduced as compared to the BCP layer prior to the anneal treatment, depending on the amount of the compound (IL) volatilized and removed. The ratio (ta/tb) of the thickness (ta (nm)) of the BCP layer after the anneal treatment to the thickness (tb (nm)) of the BCP layer prior to the anneal treatment is preferably, for example, 0.90 or less. The value of (ta/tb) is more preferably 0.85 or less, still more preferably 0.80 or less, and most preferably 0.75 or less. As the value of (ta/tb) becomes smaller, the amount of the compound (IL) remaining in the BCP layer reduces. As a result, a structure having a good shape with reduced generation of roughness can be obtained. The lower limit of the value of (ta/tb) is not particularly limited, and may be, for example, 0.50 or more.

In the present embodiment, step (ii) may include an operation of volatilizing 40% by weight or more of the compound (IL) from the BCP layer, based on the total amount of the compound (IL) contained in the resin composition for forming a phase-separated structure. In such a case, it is preferable to volatilize 45% by weight or more of the total amount of the compound (IL) contained in the resin composition for forming a phase-separated structure, more preferably 50% by weight or more, still more preferably 60% by weight or more, and most preferably 100% by weight.

In step (ii), the operation of volatilizing 40% by weight or more of the compound (IL) from the BCP layer, based on the total amount of the compound (IL) contained in the resin composition for forming a phase-separated structure, is not particularly limited. For example, as described above, the temperature condition of the anneal treatment for phase-separating the BCP layer may be adjusted, so as to volatilize 40% by weight or more of the compound (IL), based on the total amount of the compound (IL).

In the method of forming a structure containing a phase-separated structure according to the present embodiment described above, in step (ii), the compound (IL) is volatilized, and at least a part of the compound (IL) is removed from the BCP layer. The compound (IL) interacts with the block copolymer, and improves the phase-separation performance of the BCP layer. For this reason, conventionally, the anneal treatment was conducted under a temperature condition where the compound (IL) remains in the BCP layer as much as possible. However, in the present embodiment, in step (ii), the amount of the compound (IL) remaining in the BCP layer is reduced, and also the phase-separation of the BCP layer is conducted. Specifically, in the present embodiment, in step (ii), the anneal treatment is preferably conducted under a temperature condition where the amount of the compound (IL) is remaining in the BCP layer is reduced. Alternatively, in the present embodiment, in step (ii), it is preferable to conduct an operation of reducing the amount of the compound (IL) remaining in the BCP layer, and then conducting phase-separation of the BCP layer. By allowing the compound (IL) to interact with the block copolymer, and then removing the compound (IL) from the BCP layer, the phase-separation performance can be improved, and a structure having a good shape with reduced generation of roughness can be formed.

Further, in the case where, as in a conventional method, phase-separation of the BCP layer is conducted under conditions where the compound (IL) remains in the BCP layer as much as possible, matching of the polarity between the compound (IL) and the brushing layer 2 had influence on the formation of the phase-separated structure. Therefore, it was necessary to select the brushing composition depending on the kind of the compound (IL) to be used.

In the present embodiment, in step (ii), since the amount of the compound (IL) remaining in the BCP layer is reduced, the influence of the matching of polarity between the compound (IL) and the brushing layer 2 is small. Therefore, by the method of forming a structure containing a phase-separated structure according to the present embodiment, the brush composition may be freely selected without depending on the kind of the compound (IL) to be used.

[Optional Step]

The method of forming a structure containing a phase-separated structure according to the present invention is not limited to the above embodiment, and may include a step (optional step) other than steps (i) and (ii).

Examples of the optional steps include a step of selectively removing a phase constituted of at least one block of the plurality of blocks constituting the block copolymer contained in the BCP layer 3 (hereafter, referred to as "step (iii)"), and a guide pattern formation step.

Step (iii)

In step (iii), from the BCP layer 3 formed on the brush layer 2, a phase constituted of at least one block of the plurality of blocks constituting the block copolymer (phase 3a and phase 3b) is selectively removed. In this manner, a fine pattern (polymeric nanostructure) can be formed.

Examples of the method of selectively removing a phase constituted of a block include a method in which an oxygen plasma treatment or a hydrogen plasma treatment is conducted on the BCP layer.

Hereafter, among the blocks constituting the block copolymer, a block which is not selectively removed is referred to as "block $P_A$", and a block to be selectively removed is referred to as "block $P_B$". For example, after the phase separation of a layer containing a PS-PMMA block copolymer, by subjecting the layer to an oxygen plasma treatment or a hydrogen plasma treatment, the phase of PMMA is selectively removed. In such a case, the PS portion is the block $P_A$, and the PMMA portion is the block $P_B$.

Figure 2:
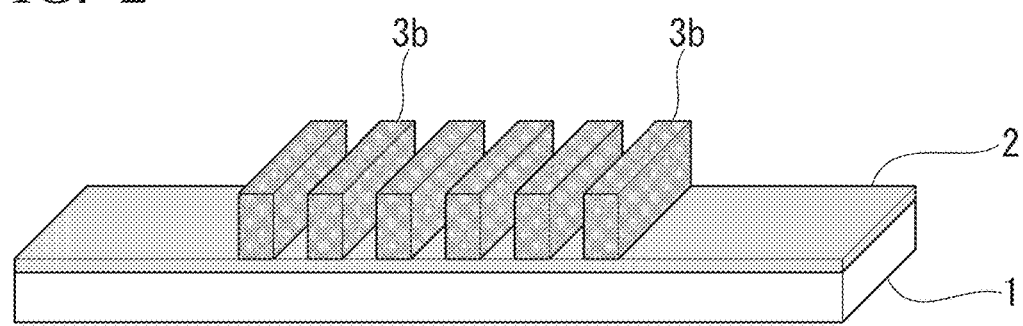
FIG. 2 is an explanatory diagram showing an example of one embodiment of an optional step.

FIG. 2 shows an example of one embodiment of step (iii).

In the embodiment shown in FIG. 2, by conducting oxygen plasma treatment on the structure 3' produced on the substrate 1 in step (ii), the phase 3a is selectively removed, and a pattern (polymeric nanostructure) constituted of phases 3b separated from each other is formed. In this case, the phase 3b is the phase constituted of the block $P_A$, and the phase 3a is the phase constituted of the block $P_B$.

The substrate 1 having a pattern formed by phase-separation of the BCP layer 3 as described above may be used as it is, or may be further heated to modify the shape of the pattern (polymeric nanostructure) on the substrate 1.

The heat treatment is preferably conducted at a temperature at least as high as the glass transition temperature of the block copolymer used and lower than the heat decomposition temperature. Further, the heating is preferably conducted in a low reactive gas such as nitrogen.

Guide Pattern Forming Step

In the method of forming a structure containing a phase-separated structure according to the present invention, a step of forming a guide pattern on the brush layer (guide pattern forming step) may be included. In this manner, it becomes possible to control the arrangement of the phase-separated structure.

For example, in the case of a block copolymer where a random fingerprint-patterned phase separation structure is formed without using a guide pattern, by providing a trench pattern of a resist film on the surface of the brush layer, a phase separation structure arranged along the trench can be obtained. The guide pattern can be provided on the brush layer 2 in accordance with the above-described principle. Further, when the surface of the guide pattern has affinity for any of the polymers constituting the block copolymer, a phase separation structure having a cylinder structure or lamellar structure arranged in the perpendicular direction of the surface of the substrate can be more reliably formed.

The guide pattern can be formed, for example, using a resist composition.

The resist composition for forming the guide pattern can be appropriately selected from resist compositions or a modified product thereof typically used for forming a resist pattern which have affinity for any of the polymers constituting the block copolymer. The resist composition may be either a positive resist composition capable of forming a positive pattern in which exposed portions of the resist film are dissolved and removed, or a negative resist pattern capable of forming a negative pattern in which unexposed portions of the resist film are dissolved and removed, but a negative resist composition is preferable. As the negative resist composition, for example, a resist composition containing an acid-generator component and a base component which exhibits decreased solubility in an organic solvent-containing developing solution under action of acid, wherein the base component contains a resin component having a structural unit which is decomposed by action of acid to exhibit increased polarity, is preferable.

When the resin composition for forming a phase-separated structure is cast onto the brush layer having the guide pattern formed thereon, an anneal treatment is conducted to cause phase-separation. Therefore, the resist pattern for forming a guide pattern is preferably capable of forming a resist film which exhibits solvent resistance and heat resistance.

(Resin Composition for Forming Phase-Separated Structure)

In the method of forming a structure containing a phase-separated structure according to the present embodiment, the resin composition for forming a phase-separated structure includes a block copolymer and an ion liquid containing a compound (IL) having a cation moiety and an anion moiety.

As one embodiment of the resin composition for forming a phase-separated structure, for example, a block copolymer and the ion liquid may be dissolved in an organic solvent component.

<Block Copolymer>

A block copolymer is a polymeric material in which plurality of blocks (partial constitutional components in which the same kind of structural unit is repeatedly bonded) are bonded. As the blocks constituting the block copolymer, 2 kinds of blocks may be used, or 3 or more kinds of blocks may be used.

The plurality of blocks constituting the block copolymer are not particularly limited, as long as they are combinations capable of causing phase separation. However, it is preferable to use a combination of blocks which are mutually incompatible. Further, it is preferable to use a combination in which a phase of at least one block amongst the plurality of blocks constituting the block copolymer can be easily subjected to selective removal as compared to the phases of other blocks.

Further, it is preferable to use a combination in which a phase of at least one block amongst the plurality of blocks constituting the block copolymer can be easily subjected to selective removal as compared to the phases of other blocks. An example of a combination which can be selectively removed reliably include a block copolymer in which one or more blocks having an etching selectivity of more than 1 are bonded.

Examples of the block copolymer include a block copolymer in which a block of a structural unit having an aromatic group is bonded to a block of a structural unit derived from an ($\alpha$-substituted) acrylate ester; a block copolymer in which a block of a structural unit having an aromatic group is bonded to a block of a structural unit derived from an ($\alpha$-substituted) acrylic acid; a block copolymer in which a block of a structural unit having an aromatic group is bonded to a block of a structural unit derived from siloxane or a derivative thereof; a block copolymer in which a block of a structural unit derived from an alkyleneoxide is bonded to a block of a structural unit derived from an ($\alpha$-substituted) acrylate ester; a block copolymer in which a block of a structural unit derived from an alkyleneoxide is bonded to a block of a structural unit derived from an ($\alpha$-substituted) acrylic acid; a block copolymer in which a block of a structural unit containing a polyhedral oligomeric silsesquioxane structure is bonded to a block of a structural unit derived from an ($\alpha$-substituted) acrylate ester; a block copolymer in which a block of a structural unit containing a silsesquioxane structure is bonded to a block of a structural unit derived from an ($\alpha$-substituted) acrylic acid; and a block copolymer in which a block of a structural unit containing a silsesquioxane structure is bonded to a block of a structural unit derived from siloxane or a derivative thereof.

Examples of the structural unit having an aromatic group include structural units having a phenyl group, a naphthyl group or the like. Among these examples, a structural unit derived from styrene or a derivative thereof is preferable.

Examples of the styrene or derivative thereof include $\alpha$-methylstyrene, 2-methylstyrene, 3-methylstyrene, 4-methylstyrene, 4-t-butylstyrene, 4-n-octylstyrene, 2,4,6-trimethylstyrene, 4-methoxy styrene, 4-t-butoxystyrene, 4-hydroxy styrene, 4-nitrostyrene, 3-nitrostyrene, 4-chlorostyrene, 4-fluorostyrene, 4-acetoxyvinylstyrene, 4-vinylbenzylchloride, 1-vinylnaphthalene, 4-vinylbiphenyl, 1-vinyl-2-pyrolidone, 9-vinylanthracene, and vinylpyridine.

An ($\alpha$-substituted) acrylic acid refers to either or both acrylic acid and a compound in which the hydrogen atom bonded to the carbon atom on the $\alpha$-position of acrylic acid has been substituted with a substituent. As an example of such a substituent, an alkyl group of 1 to 5 carbon atoms can be given.

Examples of ($\alpha$-substituted) acrylic acid include acrylic acid and methacrylic acid.

An ($\alpha$-substituted) acrylate ester refers to either or both acrylate ester and a compound in which the hydrogen atom bonded to the carbon atom on the $\alpha$-position of acrylate ester has been substituted with a substituent. As an example of such a substituent, an alkyl group of 1 to 5 carbon atoms can be given. As an example of such a substituent, an alkyl group of 1 to 5 carbon atoms can be given.

Specific examples of the ($\alpha$-substituted) acrylate ester include acrylate esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylate esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Among these, methyl acrylate, ethyl acrylate, t-butyl acrylate, methyl methacrylate, ethyl methacrylate, and t-butyl methacrylate are preferable.

Examples of siloxane and siloxane derivatives include dimethylsiloxane, diethylsiloxane, diphenylsiloxane, and methylphenylsiloxane.

Examples of the alkylene oxide include ethylene oxide, propylene oxide, isopropylene oxide and butylene oxide.

As the silsesquioxane structure-containing structural unit, polyhedral oligomeric silsesquioxane structure-containing structural unit is preferable. As a monomer which provides a polyhedral oligomeric silsesquioxane structure-containing structural unit, a compound having a polyhedral oligomeric silsesquioxane structure and a polymerizable group can be mentioned.

Among the above examples, as the block copolymer, a block copolymer containing a block of a structural unit having an aromatic group and a block of a structural unit derived from an (α-substituted) acrylic acid or an (α-substituted) acrylate ester is preferable.

In the case of obtaining a cylinder phase-separated structure oriented in a direction perpendicular to the surface of the substrate, the weight ratio of the structural unit having an aromatic group to the structural unit derived from an (α-substituted) acrylic acid or (α-substituted) acrylate ester is preferably in the range of 60:40 to 90:10, and more preferably 60:40 to 80:20.

In the case of obtaining a lamellar phase-separated structure oriented in a direction perpendicular to the surface of the substrate, the weight ratio of the structural unit having an aromatic group to the structural unit derived from an (α-substituted) acrylic acid or (α-substituted) acrylate ester is preferably in the range of 35:65 to 60:40, and more preferably 40:60 to 60:40.

Specific examples of such block copolymers include a block copolymer having a block of a structural unit derived from styrene and a block of a structural unit derived from acrylic acid; a block copolymer having a block of a structural unit derived from styrene and a block of a structural unit derived from methyl acrylate; a block copolymer having a block of a structural unit derived from styrene and a block of a structural unit derived from ethyl acrylate; a block copolymer having a block of a structural unit derived from styrene and a block of a structural unit derived from t-butyl acrylate; a block copolymer having a block of a structural unit derived from styrene and a block of a structural unit derived from methacrylic acid; a block copolymer having a block of a structural unit derived from styrene and a block of a structural unit derived from methyl methacrylate; a block copolymer having a block of a structural unit derived from styrene and a block of a structural unit derived from ethyl methacrylate; a block copolymer having a block of a structural unit derived from styrene and a block of a structural unit derived from t-butyl methacrylate; a block copolymer having a block of a structural unit containing a polyhedral oligomeric silsesquioxane (POSS) structure and a block of a structural unit derived from acrylic acid; and a block copolymer having a block of a structural unit containing a polyhedral oligomeric silsesquioxane (POSS) structure and a block of a structural unit derived from methyl acrylate.

In the present embodiment, the use of a block copolymer having a block of a structural unit derived from styrene (PS) and a block of a structural unit derived from methyl methacrylate (PMMA) is particularly preferable.

The number average molecular weight (Mn) (the polystyrene equivalent value determined by gel permeation chromatography (GPC)) of the block copolymer is preferably 20,000 to 200,000, more preferably 30,000 to 150,000, and still more preferably 50,000 to 90,000. In the method of forming a structure containing a phase-separated structure according to the present embodiment, in a resin composition for forming a phase-separated structure containing a block copolymer having a number average molecular weight which can be phase-separated without addition of the compound (IL) (e.g., Mn>80,000), by adding an ion liquid, a structure having a good shape with reduced generation of roughness may be formed without changing the period (L0).

The dispersity (Mw/Mn) of the block copolymer is preferably 1.0 to 3.0, more preferably 1.0 to 1.5, and still more preferably 1.0 to 1.3. Here, Mw is the weight average molecular weight.

In the resin composition for forming a phase-separated structure, 1 kind of block copolymer may be used, or 2 or more kinds of block copolymers may be used in combination.

In the resin composition for forming a phase-separated structure, the amount of the block copolymer may be adjusted depending on the thickness of the layer containing the block copolymer to be formed.

<Ion Liquid>

In the resin composition for forming a phase-separated structure, the ion liquid contains a compound (IL) having a specific cation moiety and anion moiety.

An ion liquid refers to a salt which is present in the form of a liquid. An ion liquid is constituted of a cation moiety and an anion moiety. The electrostatic interaction between the cation moiety and the anion moiety is week, and the salt is unlikely to be crystallized. The ion liquid has a boiling point of 100° C. or lower, and has the following characteristics 1) to 5).

Characteristic 1) The vapor pressure is extremely low. Characteristic 2) Non-flammable over a wide temperature range. Characteristic 3) Maintains a liquid state over a wide temperature range Characteristic 4) The density can be largely changed. Characteristic 5) The polarity can be controlled.

In the present embodiment, the ion liquid may be non-polymeric.

The weight average molecular weight (Mw) of the ion liquid is preferably 1,000 or less, more preferably 750 or less, and still more preferably 500 or less.

<<Compound (IL)>>

The compound (IL) is a compound having a cation moiety and an anion moiety.

Cation Moiety of Compound (IL)

The cation moiety of the compound (IL) is not particularly limited. However, in terms of improvement in the phase-separation performance, the cation moiety preferably has a dipole moment of 3 debye or more, more preferably 3.2 to 15 debye, and still more preferably 3.4 to 12 debye.

The "dipole moment of the cation moiety" is a parameter quantitatively indicating the polarity (deviation of charge) of the cation moiety. 1 debye is defined as $1 \times 10^{-18}$ esu·cm. In the present specification, the dipole moment of the cation moiety refers to a simulation value by CAChe. For example, the dipole moment of the cation moiety can be determined by optimization of the structure by CAChe Work System Pro Version 6.1.12.33, using MM geometry (MM2) and PM3 geometry.

Preferable examples of cation moiety having a dipole moment of 3 debye or more include an imidazolium ion, a pyrrolidinium ion, a piperidinium ion and an ammonium ion.

That is, preferable examples of the compound (IL) include an imidazolium salt, a pyrrolidinium salt, a piperidinium salt and an ammonium salt. Among these salts, in terms of improving the phase-separation performance, the cation moiety preferably has a substituent. Among these, a cation containing an alkyl group of 2 or more carbon atoms optionally having a substituent, or a cation containing a polar group. The alkyl group of 2 or more carbon atoms contained in the cation preferably has 2 to 12 carbon atoms, more preferably 2 to 6 carbon atoms. The alkyl group may be a linear alkyl group or a branched alkyl group, but is preferably a linear alkyl group. Examples of the substituent for the alkyl group of 2 or more carbon atoms include a hydroxy group, a vinyl group and an allyl group. The alkyl group of 2 or more carbon atoms preferably has no substituent. Examples of the polar group contained in the cation include a carboxy group, a hydroxy group, an amino group and a sulfo group.

More preferable examples of the cation moiety of the compound (IL) include a pyrrolidinium ion. Among pyrrolidinium ions, a pyrrolidinium ion containing an alkyl group of 2 or more carbon atoms which may have a substituent is preferable.

Anion Moiety of Compound (IL)

The anion moiety of the compound (IL) is not particularly limited, and examples thereof include anions represented by any one of general formulae (a1) to (a5) shown below.

[Chemical Formula 1]

(a1)

(a2)

(a3)

In formula (a1), R represents an aromatic hydrocarbon group which may have a substituent, an aliphatic cyclic group which may have a substituent, or a chain hydrocarbon group which may have a substituent. In formula (a2), R' represents an alkyl group of 1 to 5 carbon atoms optionally substituted with a fluorine atom. k represents an integer of 1 to 4, and l represents an integer of 0 to 3, provided that k+l=4. in formula (a3), R" represents an alkyl group of 1 to 5 carbon atoms optionally substituted with a fluorine atom; m represents an integer of 1 to 6, and n represents an integer of 0 to 5, provided that m+n=6.

[Chemical Formula 2]

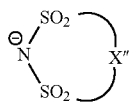

(a4)

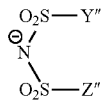

(a5)

In formula (a4), X" represents an alkylene group of 2 to 6 carbon atoms in which at least one hydrogen atom has been substituted with a fluorine atom; in formula (a5), Y" and Z" each independently represents an alkyl group of 1 to 10 carbon atoms in which at least one hydrogen atom has been substituted with a fluorine atom;

In general formula (a1), R represents an aromatic hydrocarbon group which may have a substituent, an aliphatic cyclic group which may have a substituent, or a chain hydrocarbon group which may have a substituent.

In general formula (a1), in the case where R is an aromatic hydrocarbon group which may have a substituent, examples of the aromatic ring contained in the aromatic hydrocarbon group include aromatic hydrocarbon rings, such as benzene, biphenyl, fluorene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hydrocarbon group include a group in which 1 hydrogen atom has been removed from the aforementioned aromatic hydrocarbon ring (aryl group); and a group in which 1 hydrogen atom of the aforementioned aryl group has been substituted with an alkylene group (an arylalkyl group such as a benzyl group, a phenethyl group, a 1-naphthylmethyl group, a 2-naphthylmethyl group, a 1-naphthylethyl group or a 2-naphthylethyl group). The alkylene group (alkyl chain within the arylalkyl group) preferably has 1 to 4 carbon atom, more preferably 1 or 2, and most preferably 1.

As the aromatic hydrocarbon group for R, a phenyl group or a naphthyl group is preferable, and a phenyl group is more preferable.

In general formula (a1), in the case where R represents an aliphatic cyclic group which may have a substituent, the cyclic group may be polycyclic or monocyclic. As the monocyclic aliphatic hydrocarbon group, a group in which one hydrogen atoms have been removed from a monocycloalkane is preferable. The monocycloalkane preferably has 3 to 8 carbon atoms, and specific examples thereof include cyclopentane, cyclohexane and cyclooctane. As the polycyclic aliphatic cyclic group, a group in which one hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

Among these examples, as the aliphatic cyclic group, groups in which one or more hydrogen atoms have been removed from a polycycloalkane such as adamantane, norbornane, isobornane, tricyclodecane or tetracyclododecane are more preferable.

In general formula (a1), as the chain hydrocarbon group for R, a chain alkyl group is preferable. The chain-like alkyl group preferably has 1 to 10 carbon atoms, and specific examples thereof include a linear alkyl group such as a methyl group, an ethyl group, a propyl group, a butyl group, a pentyl group, a hexyl group, a heptyl group, an octyl group, a nonyl or a decyl group, and a branched alkyl group such as a 1-methylethyl group, a 1-methylpropyl group, a 2-methylpropyl group, a 1-methylbutyl group, a 2-methylbutyl group, a 3-methylbutyl group, a 1-ethylbutyl group, a 2-ethylbutyl group, a 1-methylpentyl group, a 2-methylpentyl group, a 3-methylpentyl group or a 4-methylpentyl group. The chain-like alkyl group preferably has 1 to 6 carbon atoms, and more preferably 1 to 3 carbon atoms. Further, a linear alkyl group is preferable.

In general formula (a1), examples of the substituent for the aromatic hydrocarbon group, the aliphatic cyclic group or the chain hydrocarbon group for R include a hydroxy group, an alkyl group, a fluorine atom or a fluorinated alkyl group.

In general formula (a1), as R, a methyl group, a trifluoromethyl group or a p-tolyl group is preferable.

In general formula (a2), R' represents an alkyl group of 1 to 5 carbon atoms optionally substituted with a fluorine atom.

k represents an integer of 1 to 4, preferably an integer of 3 to 4, and most preferably 4.

l represents an integer of 0 to 3, preferably 0 to 2, most preferably 0. When l is 2 or more, the plurality of R' may be the same or different from each other, but are preferably the same.

In general formula (a3), R'' represents an alkyl group of 1 to 5 carbon atoms optionally substituted with a fluorine atom;

m represents an integer of 1 to 6, preferably an integer of 3 to 6, and most preferably 6.

n represents an integer of 0 to 5, preferably 0 to 3, most preferably 0. When n is 2 or more, the plurality of R'' may be the same or different from each other, but are preferably the same.

In formula (a4), X'' represents an alkylene group of 2 to 6 carbon atoms in which at least one hydrogen atom has been substituted with a fluorine atom. The alkylene group may be linear or branched, and has 2 to 6 carbon atoms, preferably 3 to 5 carbon atoms, and most preferably 3 carbon atoms.

In formula (a5), Y'' and Z'' each independently represents an alkyl group of 1 to 10 carbon atoms in which at least one hydrogen atom has been substituted with a fluorine atom. The alkyl group may be linear or branched, and has 1 to 10 carbon atoms, preferably 1 to 7 carbon atoms, and most preferably 1 to 3 carbon atoms.

The smaller the number of carbon atoms of the alkylene group for X'' or those of the alkyl group for Y'' and Z'' within the above-mentioned range of the number of carbon atoms, the more the solubility in an organic solvent component is improved.

In the alkylene group for X'' and the alkyl group for Y'' and Z'', it is preferable that the number of hydrogen atoms substituted with fluorine atoms is as large as possible because the acid strength increases. The amount of fluorine atoms within the alkylene group or alkyl group, i.e., fluorination ratio, is preferably from 70 to 100%, more preferably from 90 to 100%, and it is particularly desirable that the alkylene group or alkyl group be a perfluoroalkylene or perfluoroalkyl group in which all hydrogen atoms are substituted with fluorine atoms.

As the anion moiety of the compound (IL), among the anion moieties represented by the aforementioned general formulae (a1) to (a5), an anion moiety represented by general formula (a1) or (a5) is preferable.

Preferable combinations of the anion moiety and the cation moiety of the compound (IL) include a combination of a cation moiety consisting of a pyrrolidinium ion and an anion moiety represented by the aforementioned general formula (a1) or (a5).

Specific examples of the compound (IL) are shown below, but the compound (IL) is by no means limited by these examples.

[Chemical Formula 3]

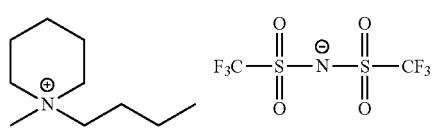

(IL-1)

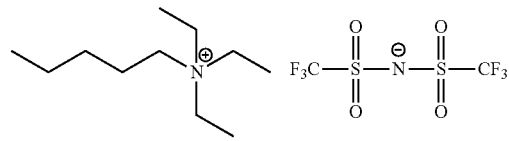

(IL-2)

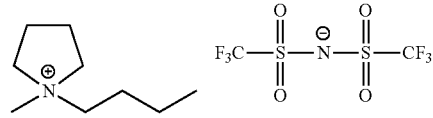

(IL-3)

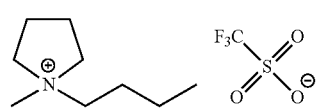

(IL-4)

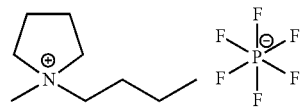

(IL-5)

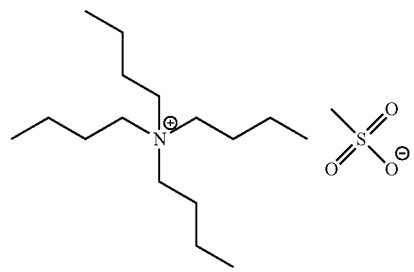

(IL-6)

[Chemical Formula 4]

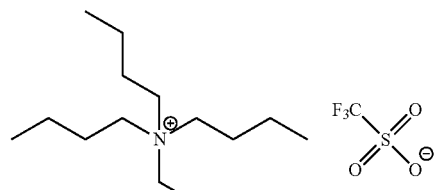

(IL-7)

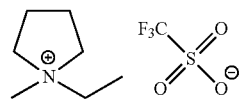

(IL-8)

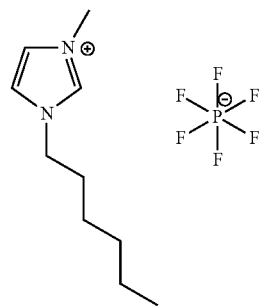

(IL-9)

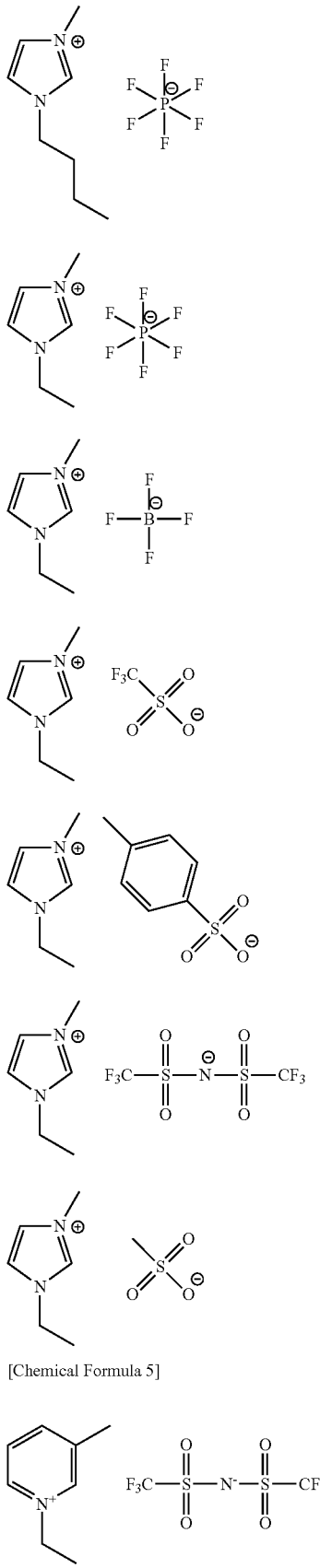

In the resin composition for forming a phase-separated structure, as the compound (IL), 1 kind of compound may be used, or 2 or more kinds of compounds may be used in combination.

In the resin composition for forming a phase-separated structure, the amount of the compound (IL) relative to 100 parts by weight of the block copolymer is preferably 1.0 parts by weight or more, more preferably 3.0 parts by weight or more, still more preferably 5.0 parts by weight or more, and most preferably 8.5 parts by weight or more.

In the method of forming a structure containing a phase-separated structure according to the present embodiment, by conducting the anneal treatment at a high temperature, the compound (IL) is vaporized and removed from the BCP layer. Therefore, in the resin composition for forming a phase-separated structure, the amount of the compound (IL) may be increased, as compared to a conventional method. By increasing the amount of the compound (IL) in the resin composition for forming a phase-separated structure, the interaction between the block copolymer and the compound (IL) is promoted, and the phase-separation performance is improved.

Further, in the resin composition for forming a phase-separated structure, the amount of the compound (IL) relative to 100% by weight of the resin composition for forming a phase-separated structure is preferably 0.030% by weight or more, more preferably 0.065% by weight or more, and still more preferably 0.070% by weight or more.

In the resin composition for forming a phase-separated structure, the upper limit of the amount of the compound (IL) relative to 100 parts by weight of the block copolymer is not particularly limited, but is preferably 40 parts by weight or less, more preferably 30 parts by weight or less, and still more preferably 20 parts by weight or less. The range of the amount of the compound (IL) relative to 100 parts by weight of the block copolymer may be 1.0 to 40 parts by weight, 3.0 to 30 parts by weight, 5.0 to 30 parts by weight, or 8.5 to 20 parts by weight.

Further, in the resin composition for forming a phase-separated structure, the amount of the compound (IL) relative to 100% by weight of the resin composition for forming a phase-separated structure is preferably 3.0% by weight or less, more preferably 1.0% by weight or less, and still more preferably 0.5% by weight or less. The range of the amount of the compound (IL) relative to 100% by weight of the resin composition for forming a phase-separated structure may be 0.030 to 3.0% by weight, 0.065 to 1.0% by weight, or 0.070 to 0.5% by weight.

In the resin composition for forming a phase-separated structure according to the present embodiment, the ion liquid may contain a compound other than the compound (IL) which has a cation moiety and an anion moiety.

In the ion liquid the amount of the compound (IL) based on the total weight of the ion liquid is preferably 50% by weight or more, more preferably 70% by weight or more, still more preferably 90% by weight or more, and may be even 100% by weight. When the amount of the compound (IL) within the ion liquid is at least as large as the lower limit of the above preferable range, the phase-separation performance may be further improved.

<Organic Solvent Component>

The resin composition for forming a phase-separated structure may be prepared by dissolving the block copolymer and the ion liquid in an organic solvent component.

The organic solvent component may be any organic solvent which can dissolve the respective components to give a uniform solution, and one or more kinds of any organic solvent can be appropriately selected from those which have been conventionally known as solvents for a film composition containing a resin as a main component.

Examples of the organic solvent component include lactones such as γ-butyrolactone; ketones such as acetone, methyl ethyl ketone, cyclohexanone, methyl-n-pentyl ketone, methyl isopentyl ketone, and 2-heptanone; polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

As the organic solvent component, 1 kind of solvent may be used, or 2 or more kinds of solvents may be used in combination.

Among these examples, propylene glycol monomethyl ether acetate (PGMEA), propylene glycol monomethyl ether (PGME), cyclohexanone and ethyl lactate (EL) are preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2.

For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME weight ratio is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the organic solvent component for the resin composition for forming a phase-separated structure, a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the organic solvent component in the resin composition for forming a phase-separated structure is not particularly limited, and is adjusted appropriately to a concentration that enables application of a coating solution depending on the thickness of the coating film. In general, the organic solvent component is used in an amount that yields a solid content within a range from 0.2 to 70% by weight, and preferably from 0.2 to 50% by weight.

<Optional Components>

If desired, in addition to the block copolymer, the ion liquid and the organic solvent component, other miscible additives can also be added to the resin composition for forming a phase-separated structure. Examples of such miscible additives include additive resins for improving the performance of the layer of the brush layer, surfactants for improving the applicability, dissolution inhibitors, plasticizers, stabilizers, colorants, halation prevention agents, dyes, sensitizers, base amplifiers and basic compounds.

As described above, in the method of forming a structure containing a phase-separated structure according to the present embodiment, since the amount of the compound (IL) in the resin composition for forming a phase-separated structure may be increased, as compared to a conventional method, the interaction between the block copolymer and the compound (IL) is promoted, and the phase-separation performance is improved.

In general, when the BCP layer contains the compound (IL), L0 becomes large. However, as described above, since the compound (IL) is removed from the BCP layer by the anneal treatment, the phase-separation performance can be improved while maintaining L0. Therefore, in the case where a block copolymer having a low polymerization degree is used, a structure having a small L0, i.e., a pattern having a finer structure can be formed.

Further, a structure produced by the method of forming a structure containing a phase-separated structure according to the present embodiment is unlikely to have generation of defects, and the etching resistance is improved.

EXAMPLES

As follows is a description of examples of the present invention, although the scope of the present invention is by no way limited by these examples.

In the following examples, a compound represented by a chemical formula (1) is denoted as "compound (1)", and the same applies for compounds represented by other chemical formulae.

Examples 1 to 41, Comparative Examples 1 to 16

(Preparation of Resin Composition for Forming Phase-Separated Structure)

The components shown in Table 1 were mixed together and dissolved to obtain each resin composition for forming phase-separated structure.

TABLE 1

| Resin composition for forming phase-separated structure | Block copolymer | Ion liquid | Organic solvent component |
|---|---|---|---|
| (1)  | BCP-1 [100] | (IL)-1 [6.0]  | (S)-1 [8320] |
| (2)  | BCP-1 [100] | (IL)-1 [12.0] | (S)-1 [8320] |
| (3)  | BCP-2 [100] | (IL)-1 [6.0]  | (S)-1 [8320] |
| (4)  | BCP-3 [100] | (IL)-1 [3.0]  | (S)-1 [8320] |
| (5)  | BCP-3 [100] | (IL)-1 [6.0]  | (S)-1 [8320] |
| (6)  | BCP-3 [100] | (IL)-1 [9.0]  | (S)-1 [8320] |
| (7)  | BCP-3 [100] | (IL)-1 [12.0] | (S)-1 [8320] |
| (8)  | BCP-1 [100] | —             | (S)-1 [8320] |
| (9)  | BCP-2 [100] | —             | (S)-1 [8320] |
| (10) | BCP-3 [100] | —             | (S)-1 [8320] |
| (11) | BCP-3 [100] | (IL)-2 [4.3]  | (S)-1 [8320] |
| (12) | BCP-3 [100] | (IL)-2 [8.7]  | (S)-1 [8320] |
| (13) | BCP-3 [100] | (IL)-2 [13.1] | (S)-1 [8320] |

In Table 1, the reference characters indicate the following. The values in brackets [ ] indicate the amount (in terms of parts by weight) of the component added.

BCP-1: a block copolymer of polystyrene (PS block) and poly(methyl methacrylate) (PMMA block) [Mn: PS 31,600, PMMA 30,400, total 62,000; PS/PMMA compositional ratio (weight ratio) 51/49; dispersity 1.02].

BCP-2: a block copolymer of polystyrene (PS block) and poly(methyl methacrylate) (PMMA block) [Mn: PS 34,300, PMMA 31,700, total 66,000; PS/PMMA compositional ratio (weight ratio) 52/48; dispersity 1.02].

BCP-3: a block copolymer of polystyrene (PS block) and poly(methyl methacrylate) (PMMA block) [Mn: PS 41,800, PMMA 40,200, total 82,000; PS/PMMA compositional ratio (weight ratio) 51/49; dispersity 1.02].

(S)-1: propyleneglycol monomethyletheracetate (PGMEA).

(IL)-1: compound represented by the following chemical formula (IL)-1 (IL)-2: compound represented by the following chemical formula (IL)-2

[Chemical Formula 6]

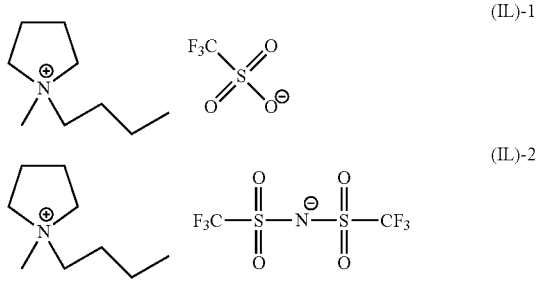

<Production of Structure Containing Phase-Separated Structure (1)>[Step (i)]

The following brush composition was applied to a 300 mm silicon (Si) wafer by spin-coating (number of rotation: 1,500 rpm, 60 seconds), followed by drying by baking in air at 250° C. for 60 minutes, so as to form a brush layer having a film thickness of 60 nm.

As the brush composition, a PGMEA solution of a copolymer having a styrene (St) unit, a methyl methacrylate (MMA) unit and a 2-hydroxyethyl methacrylate (HEMA) unit (St/MMA/HEMA=82/12/6 (mol %)) (resin content: 2.0% by weight).

Subsequently, the brush layer was rinsed with OK73 thinner (product name; manufactured by Tokyo Ohka Kogyo Co., Ltd.) for 15 seconds, so as to remove the uncrosslinked portions and the like of the random copolymer. Then, baking was conducted at 100° C. for 60 seconds. After the baking, the brush layer formed on the Si wafer had a film thickness of 7 nm.

Thereafter, the resin composition for forming a phase-separated structure of each example (solid content: 1.2% by weight) was spin-coated (number of rotation: 1,500 rpm, 60 seconds) to cover the brush layer formed on the wafer, followed by drying by shaking, so as to form a PS-PMMA block copolymer layer having a film thickness of 30 nm.

[Step (ii)]

Next, in a nitrogen atmosphere, an anneal treatment was conducted under the conditions shown in Tables 2 and 3, so as to phase-separate the PS-PMMA block copolymer layer into a phase constituted of PS and a phase constituted of PMMA, thereby forming a structure containing a phase-separated structure.

[Step (iii)]

An oxygen plasma treatment was conducted on the silicon (Si) wafer having the phase-separated structure formed thereon, so as to selectively remove the phase constituted of PMMA.

<Evaluation of Phase-Separation Performance (1)>

With respect to the structure containing a phase-separated structure formed in each example by the above production method, the period (L0) was determined. The period (L0) of the structure containing a phase-separated structure was determined by observing the surface of the obtained substrate (the phase-separation state) with a scanning electron microscope (CG6300; manufactured by Hitachi High-Technologies Corporation), and the observed fingerprint pattern was measured using an off-line length measuring software (manufactured by Hitachi High-Technologies Corporation).

The period (L0) of each structure containing a phase-separated structure is shown in Tables 2 and 3.

<Evaluation of FER (fingerprint edge roughness) (1)>

With respect to the structure containing a phase-separated structure formed in each example by the above production method, 3σ was determined as a yardstick of FER. The results are indicated under "FER (nm)" in Tables 2 and 3.

"3σ" was determined by observing the surface of the obtained substrate (the phase-separation state) with a scanning electron microscope (CG6300; manufactured by Hitachi High-Technologies Corporation), and the observed fingerprint pattern was measured using an off-line length measuring software (manufactured by Hitachi High-Technologies Corporation). "3σ" (unit: nm) indicates a value of 3 times the standard deviation (σ).

The smaller this 3σ value is, the lower the level of roughness on the structure containing a phase-separated structure, indicating that a structure having a good shape with reduced generation of roughness was obtained.

TABLE 2

| | Resin composition for forming phase-separated structure | Anneal treatment conditions | | Period (L0/nm) | FER (nm) |
|---|---|---|---|---|---|
| | | Temperature (° C.) | Time (minute) | | |
| Example 1 | (1) | 250 | 15 | 31 | 2.4 |
| Example 2 | (1) | 250 | 30 | 30 | 2.0 |
| Example 3 | (1) | 250 | 60 | 30 | 2.3 |
| Example 4 | (3) | 250 | 15 | 32 | 2.8 |
| Example 5 | (3) | 250 | 30 | 31 | 2.6 |
| Example 6 | (3) | 250 | 60 | 31 | 2.9 |
| Example 7 | (4) | 250 | 15 | 37 | 4.4 |
| Example 8 | (4) | 250 | 30 | 37 | 4.1 |
| Example 9 | (4) | 250 | 60 | 37 | 4.1 |
| Example 10 | (4) | 250 | 120 | 37 | 4.2 |
| Example 11 | (5) | 250 | 30 | 36 | 2.5 |
| Example 12 | (5) | 250 | 60 | 36 | 2.3 |
| Example 13 | (5) | 250 | 120 | 36 | 1.8 |
| Example 14 | (6) | 250 | 60 | 37 | 2.3 |
| Example 15 | (6) | 250 | 120 | 36 | 2.0 |
| Example 16 | (7) | 250 | 60 | 37 | 2.6 |
| Example 17 | (7) | 250 | 120 | 36 | 1.8 |
| Comparative Example 1 | (8) | 250 | 15 | 31 | 3.5 |
| Comparative Example 2 | (8) | 250 | 30 | 31 | 3.6 |
| Comparative Example 3 | (8) | 250 | 60 | 31 | 3.5 |
| Comparative Example 4 | (9) | 250 | 15 | 32 | 3.9 |
| Comparative Example 5 | (9) | 250 | 30 | 32 | 3.8 |
| Comparative Example 6 | (9) | 250 | 60 | 32 | 4.1 |
| Comparative Example 7 | (10) | 250 | 15 | 37 | 4.9 |
| Comparative Example 8 | (10) | 250 | 30 | 37 | 5.0 |
| Comparative Example 9 | (10) | 250 | 60 | 37 | 4.7 |
| Comparative Example 10 | (10) | 250 | 120 | 37 | 4.7 |
| Comparative Example 11 | (1) | 200 | 15 | No phase-separation | |
| Comparative Example 12 | (2) | 200 | 60 | No phase-separation | |

As seen from the results shown in Table 2, with respect to the structures containing a phase-separated structure formed by the method of Examples 1 to 17 according to the present invention, it was confirmed that FER was small, and a structure having a good shape with reduced generation of roughness could be formed, as compared to the structure containing a phase-separated structure formed by the method of Comparative Examples 1 to 10. Further, it was confirmed that, by the method of Examples 1 to 17, a structure containing a phase-separated structure having about the same period (L) as a structure containing a phase-separated structure obtained by the method of Comparative Examples 1 to 10 (in which a resin composition for forming a phase-separated structure containing the same block copolymer was used) could be obtained (Examples 1 to 3 vs. Comparative Examples 1 to 3; Examples 4 to 6 vs. Comparative Examples 4 to 6; and Examples 7 to 17 vs. Comparative Examples 7 to 10).

On the other hand, in the method of Comparative Examples 11 and 12 in which the anneal treatment was conducted under a temperature condition of 200° C., a phase-separated structure could not be formed.

TABLE 3

| | Resin composition for forming phase-separated structure | Anneal treatment conditions | | Period (L0/nm) | FER (nm) |
|---|---|---|---|---|---|
| | | Temperature (° C.) | Time (minute) | | |
| Example 18 | (4) | 270 | 15 | 36 | 2.3 |
| Example 19 | (4) | 270 | 30 | 36 | 2.4 |
| Example 20 | (4) | 270 | 60 | 36 | 2.0 |
| Example 21 | (4) | 270 | 120 | 36 | 1.9 |
| Example 22 | (5) | 270 | 15 | 36 | 2.0 |
| Example 23 | (5) | 270 | 30 | 36 | 2.2 |
| Example 24 | (5) | 270 | 60 | 36 | 2.2 |
| Example 25 | (5) | 270 | 120 | 36 | 2.0 |
| Example 26 | (6) | 270 | 15 | 36 | 1.8 |
| Example 27 | (6) | 270 | 30 | 36 | 2.3 |
| Example 28 | (6) | 270 | 60 | 36 | 2.1 |
| Example 29 | (6) | 270 | 120 | 36 | 2.2 |
| Example 30 | (7) | 270 | 30 | 36 | 2.0 |
| Example 31 | (7) | 270 | 60 | 36 | 2.1 |
| Example 32 | (7) | 270 | 120 | 36 | 2.1 |
| Example 33 | (11) | 250 | 15 | 36 | 1.9 |
| Example 34 | (11) | 250 | 30 | 36 | 2.0 |
| Example 35 | (11) | 250 | 60 | 36 | 1.9 |
| Example 36 | (11) | 250 | 120 | 36 | 2.2 |
| Example 37 | (12) | 250 | 30 | 36 | 1.6 |
| Example 38 | (12) | 250 | 60 | 36 | 1.8 |
| Example 39 | (12) | 250 | 120 | 36 | 1.7 |
| Example 40 | (13) | 250 | 60 | 36 | 1.9 |
| Example 41 | (13) | 250 | 120 | 36 | 1.4 |
| Comparative Example 13 | (10) | 270 | 15 | 36 | 4.6 |
| Comparative Example 14 | (10) | 270 | 30 | 36 | 4.6 |
| Comparative Example 15 | (10) | 270 | 60 | 36 | 4.6 |
| Comparative Example 16 | (10) | 270 | 120 | 36 | 4.6 |

As seen from the results shown in Table 3, it was confirmed that, in the method of Examples 18 to 32 in which a resin composition for forming a phase-separated structure containing compound (IL)-1 as an ion liquid was used, FER was small, and a structure having a good shape with reduced generation of roughness could be obtained, as compared to the structure containing a phase-separated structure formed by the method of Comparative Examples 13 to 16 in which a resin composition for forming a phase-separated structure containing no ion liquid was used. Further, it was also confirmed that, in the method of Examples 33 to 41 in which a resin composition for forming a phase-separated structure containing compound (IL)-2 as an ion liquid was used, FER was small, and a structure having a good shape with reduced generation of roughness could be obtained.

Examples 42 to 65, Comparative Examples 17 to 28

(Preparation of Resin Composition for Forming Phase-Separated Structure)

The components shown in Table 4 were mixed together and dissolved to obtain each resin composition for forming phase-separated structure.

TABLE 4

| Resin composition for forming phase-separated structure | Block copolymer | Ion liquid | Organic solvent component |
|---|---|---|---|
| (14) | BCP-4 [100] | (IL)-2 [3.0] | (S)-1 [3450] |

TABLE 4-continued

| Resin composition for forming phase-separated structure | Block copolymer | Ion liquid | Organic solvent component |
|---|---|---|---|
| (15) | BCP-4 [100] | (IL)-2 [9.0] | (S)-1 [3450] |
| (16) | BCP-4 [100] | (IL)-3 [3.0] | (S)-1 [3450] |
| (17) | BCP-4 [100] | (IL)-3 [9.0] | (S)-1 [3450] |
| (18) | BCP-4 [100] | (IL)-4 [3.0] | (S)-1 [3450] |
| (19) | BCP-4 [100] | (IL)-4 [9.0] | (S)-1 [3450] |
| (20) | BCP-4 [100] | (IL)-5 [3.0] | (S)-1 [3450] |
| (21) | BCP-4 [100] | (IL)-5 [9.0] | (S)-1 [3450] |
| (22) | BCP-4 [100] | (IL)-6 [3.0] | (S)-1 [3450] |
| (23) | BCP-4 [100] | (IL)-6 [9.0] | (S)-1 [3450] |
| (24) | BCP-4 [100] | (IL)-1 [3.0] | (S)-1 [3450] |
| (25) | BCP-4 [100] | (IL)-1 [9.0] | (S)-1 [3450] |
| (26) | BCP-4 [100] | — | (S)-1 [3450] |

In Table 4, the reference characters indicate the following. The values in brackets [ ] indicate the amount (in terms of parts by weight) of the component added.

BCP-4: a block copolymer of polystyrene (PS block) and poly(methyl methacrylate) (PMMA block) [Mn: PS 41,800, PMMA 40,200, total 82,000; PS/PMMA compositional ratio (weight ratio) 51/49; dispersity 1.02].

(S)-1: propyleneglycol monomethyletheracetate (PG-MEA).

(IL)-1: compound represented by the aforementioned chemical formula (IL)-1

(IL)-2: compound represented by the aforementioned chemical formula (IL)-2

(IL)-3: compound represented by the following chemical formula (IL)-3

(IL)-4: compound represented by the following chemical formula (IL)-4

(IL)-5: compound represented by the following chemical formula (IL)-5

(IL)-6: compound represented by the following chemical formula (IL)-6

[Chemical Formula 7]

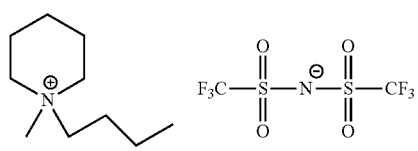
(IL)-3

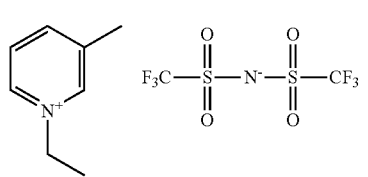
(IL)-4

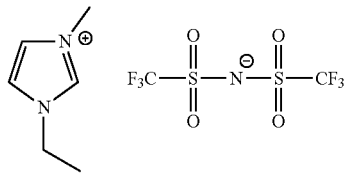
(IL)-5

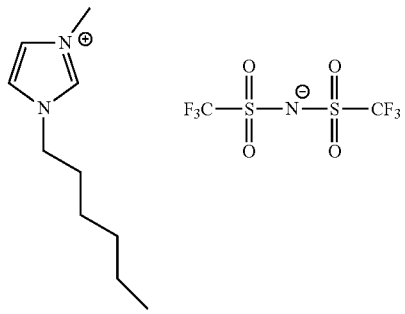
(IL)-6

<Production of Structure Containing Phase-Separated Structure (2)>

A structure containing a phase-separated structure was formed in the same manner as in the aforementioned <Production of structure containing phase-separated structure (1)>, except that a resin composition for forming a phase-separated structure shown in Tables 5 to 7 was used in step (i), and the anneal treatment in step (ii) was conducted under the conditions shown in Tables 5 to 7.

<Evaluation of Phase-Separation Performance (2)>

The surface of the obtained substrate (the phase-separation state) was observed using a scanning electron microscope (SEM) (CG6300; manufactured by Hitachi High-Technologies Corporation), and evaluation was conducted in accordance with the following criteria. The results are shown in Tables 5 to 7.

A: phase-separation was confirmed
B: partial phase-separation was confirmed
C: no phase-separation <Evaluation of Residual Ratio of Ion Liquid>

A part of the structure containing a phase-separated structure formed by the method of each example was cut out, and the residual ratio (%) of the ion liquid within the structure containing a phase-separated structure was measured by high performance liquid chromatography (HPLC). The results are indicated "IL residual ratio (%)" in Tables 5 to 7.

TABLE 5

| Resin composition for forming phase-separated structure | Anneal treatment conditions | | IL residual ratio (%) | Phase-separation performance |
|---|---|---|---|---|
| | Temperature (° C.) | Time (minute) | | |
| Comparative Example 17 | (14) | 90 | 1 | 100 | C |
| Example 42 | (14) | 270 | 15 | 38 | B |
| Example 43 | (14) | 270 | 60 | 0 | A |
| Comparative Example 18 | (15) | 90 | 1 | 100 | C |
| Example 44 | (15) | 270 | 15 | 42 | B |
| Example 45 | (15) | 270 | 60 | 0 | A |

TABLE 5-continued

| | Resin composition for forming phase-separated structure | Anneal treatment conditions | | IL residual ratio (%) | Phase-separation performance |
|---|---|---|---|---|---|
| | | Temperature (° C.) | Time (minute) | | |
| Comparative Example 19 | (16) | 90 | 1 | 100 | C |
| Example 46 | (16) | 270 | 15 | 41 | B |
| Example 47 | (16) | 270 | 60 | 0 | A |
| Comparative Example 20 | (17) | 90 | 1 | 100 | C |
| Example 48 | (17) | 270 | 15 | 45 | B |
| Example 49 | (17) | 270 | 60 | 0 | A |

TABLE 6

| | Resin composition for forming phase-separated structure | Anneal treatment conditions | | IL residual ratio (%) | Phase-separation performance |
|---|---|---|---|---|---|
| | | Temperature (° C.) | Time (minute) | | |
| Comparative Example 21 | (18) | 90 | 1 | 100 | C |
| Example 50 | (18) | 270 | 15 | 33 | B |
| Example 51 | (18) | 270 | 60 | 0 | A |
| Comparative Example 22 | (19) | 90 | 1 | 100 | C |
| Example 52 | (19) | 270 | 15 | 37 | B |
| Example 53 | (19) | 270 | 60 | 0 | A |
| Comparative Example 23 | (20) | 90 | 1 | 100 | C |
| Example 54 | (20) | 270 | 15 | 31 | B |
| Example 55 | (20) | 270 | 60 | 0 | A |
| Comparative Example 24 | (21) | 90 | 1 | 100 | C |
| Example 56 | (21) | 270 | 15 | 34 | B |
| Example 57 | (21) | 270 | 60 | 0 | A |

TABLE 7

| | Resin composition for forming phase-separated structure | Anneal treatment conditions | | IL residual ratio (%) | Phase-separation performance |
|---|---|---|---|---|---|
| | | Temperature (° C.) | Time (minute) | | |
| Comparative Example 25 | (22) | 90 | 1 | 100 | C |
| Example 58 | (22) | 270 | 15 | 26 | B |
| Example 59 | (22) | 270 | 60 | 0 | A |
| Comparative Example 26 | (23) | 90 | 1 | 100 | C |
| Example 60 | (23) | 270 | 15 | 28 | B |
| Example 61 | (23) | 270 | 60 | 0 | A |
| Comparative Example 27 | (24) | 90 | 1 | 100 | C |
| Example 62 | (24) | 270 | 15 | 47 | B |
| Example 63 | (24) | 270 | 60 | 0 | A |
| Comparative Example 28 | (25) | 90 | 1 | 100 | C |
| Example 64 | (25) | 270 | 15 | 50 | B |
| Example 65 | (25) | 270 | 60 | 0 | A |

As seen from the results shown in Tables 5 to 7, it was confirmed that, in Examples 42 to 65 which applied the present invention, a part of the compound (IL) was volatilized from the block copolymer layer, and the PS-PMMA block copolymer layer was phase-separated.

Example 66, Comparative Example 29

<Production of Structure Containing Phase-Separated Structure (3)>

A structure containing a phase-separated structure was formed in the same manner as in the aforementioned <Production of structure containing phase-separated structure (1)>, except that a resin composition for forming a phase-separated structure shown in Table 8 was used in step (i), and the anneal treatment in step (ii) was conducted under the conditions shown in Table 8.

<Evaluation of Phase-Separation Performance (3)>

With respect to the structure containing a phase-separated structure formed in each example by the above production method, 3σ was determined as a yardstick of FER. The results are indicated under "FER (nm)" in Table 8. "3σ" was determined in the same manner as in the aforementioned <Evaluation of FER (fingerprint edge roughness) (1)>.

Figure 3:
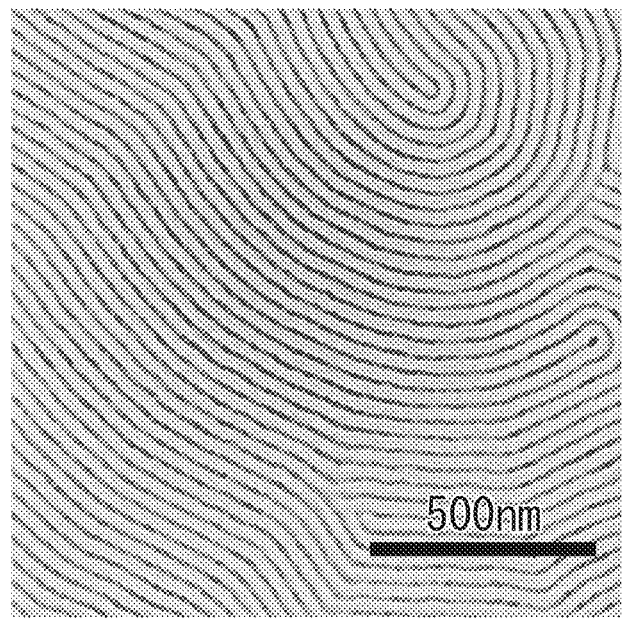
FIG. 3 is a scanning electron micrograph of a structure containing a phase-separated structure produced in example.
Figure 4:
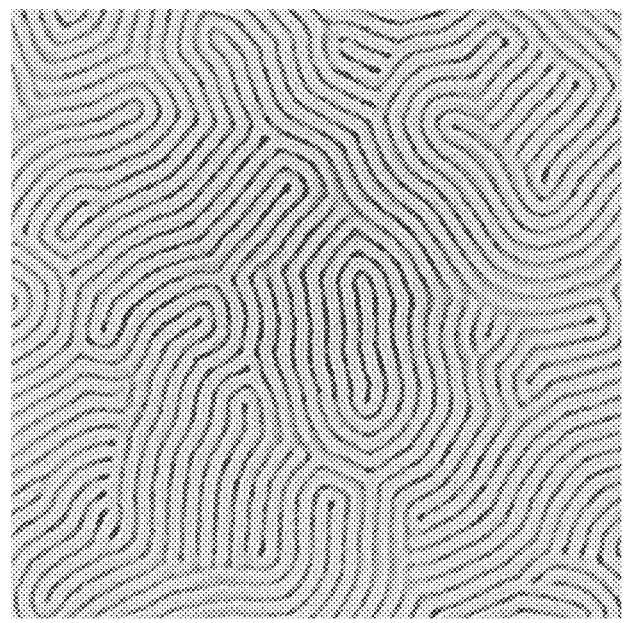
FIG. 4 is a scanning electron micrograph of a structure containing a phase-separated structure produced in comparative example.

FIG. 3 is a scanning electron micrograph of a structure containing a phase-separated structure produced in Example 66. FIG. 4 is a scanning electron micrograph of a structure containing a phase-separated structure produced in Comparative Example 29.

TABLE 8

| | Resin composition for forming phase-separated structure | Anneal treatment conditions | | FER (nm) |
|---|---|---|---|---|
| | | Temperature (° C.) | Time (minute) | |
| Example 66 | (14) | 270 | 60 | 2.9 |
| Comparative Example 29 | (26) | 270 | 60 | 3.6 |

As seen from the results shown in Table 8 and FIGS. 3 and 4, in Example 66 which applied the present invention, by adding an ion liquid to the resin composition for forming a phase-separated structure, it was confirmed that the roughness of the phase-separated structure has been improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of producing a structure containing a phase-separated structure, comprising:
    applying a resin composition to a substrate, wherein the resin composition comprises a block copolymer and an ion liquid, wherein the ion liquid has a cation moiety and an anion moiety, to form a BCP layer containing the block copolymer and the ion liquid on the substrate; and
    heating the BCP layer on the substrate at a temperature of 210° C. or higher to vaporize 40% by weight or more of the ion liquid from the BCP layer, based on the total amount of the ion liquid contained in the resin composition, thereby phase-separating the BCP layer to obtain a structure containing a phase-separated structure.

2. The method of producing a structure containing a phase-separated structure according to claim 1, wherein the block copolymer has a number average molecular weight of 20,000 to 200,000.

3. The method of producing a structure containing a phase-separated structure according to claim 1, wherein the temperature for heating the BCP layer on the substrate is 240° C. or higher.

* * * * *